(12) United States Patent
Dally

(10) Patent No.: US 8,982,140 B2
(45) Date of Patent: Mar. 17, 2015

(54) HIERARCHICAL MEMORY ADDRESSING

(75) Inventor: William James Dally, Stanford, CA (US)

(73) Assignee: NVIDIA Corporation, Santa Clara, CA (US)

( * ) Notice: Subject to any disclaimer, the term of this patent is extended or adjusted under 35 U.S.C. 154(b) by 653 days.

(21) Appl. No.: 13/241,745

(22) Filed: Sep. 23, 2011

(65) Prior Publication Data
US 2012/0075319 A1    Mar. 29, 2012

Related U.S. Application Data

(60) Provisional application No. 61/386,256, filed on Sep. 24, 2010.

(51) Int. Cl.
G06F 13/28 (2006.01)
G06F 15/16 (2006.01)
G06F 12/02 (2006.01)
G06F 12/08 (2006.01)

(52) U.S. Cl.
CPC ............ *G06F 12/0284* (2013.01); *G06F 12/08* (2013.01); *G06F 12/0811* (2013.01); *G06F 2212/2515* (2013.01); *G06F 2212/302* (2013.01); *G06F 2213/0038* (2013.01)
USPC ........... 345/542; 711/117; 711/122; 345/557; 345/531

(58) Field of Classification Search
None
See application file for complete search history.

(56) References Cited

U.S. PATENT DOCUMENTS

| 5,898,883 | A | * | 4/1999 | Fujii et al. | 712/28 |
| 6,249,911 | B1 | * | 6/2001 | Arimilli et al. | 717/151 |
| 2003/0154345 | A1 | * | 8/2003 | Lyon | 711/122 |
| 2006/0129585 | A1 | * | 6/2006 | Ishiki et al. | 707/101 |
| 2009/0063772 | A1 | * | 3/2009 | Magoshi | 711/122 |
| 2009/0216947 | A1 | * | 8/2009 | Bohn et al. | 711/118 |
| 2009/0248941 | A1 | * | 10/2009 | Morein et al. | 710/308 |

* cited by examiner

Primary Examiner — Ulka Chauhan
Assistant Examiner — Sultana M Zalalee
(74) Attorney, Agent, or Firm — Zilka-Kotab, PC

(57) ABSTRACT

One embodiment of the present invention sets forth a technique for addressing data in a hierarchical graphics processing unit cluster. A hierarchical address is constructed based on the location of a storage circuit where a target unit of data resides. The hierarchical address comprises a level field indicating a hierarchical level for the unit of data and a node identifier that indicates which GPU within the GPU cluster currently stores the unit of data. The hierarchical address may further comprise one or more identifiers that indicate which storage circuit in a particular hierarchical level currently stores the unit of data. The hierarchical address is constructed and interpreted based on the level field. The technique advantageously enables programs executing within the GPU cluster to efficiently access data residing in other GPUs using the hierarchical address.

22 Claims, 7 Drawing Sheets

HIERARCHICAL MEMORY ADDRESSING

CROSS-REFERENCE TO RELATED APPLICATIONS

This application claims priority benefit to U.S. provisional patent application titled, "Hierarchical Memory Addressing," filed on Sep. 24, 2010 and having Ser. No. 61/386,256. This related application is hereby incorporated herein by reference in its entirety.

BACKGROUND OF THE INVENTION

1. Field of the Invention

Embodiments of the present invention generally relate to multiple graphics processing unit (GPU) systems and more specifically to hierarchical memory addressing.

2. Description of Related Art

Commercial graphics processing unit (GPU) computation systems commonly configure a cluster of multiple GPU devices to operate in concert, for example, to solve a single problem. In such systems, each GPU device typically executes instructions to solve a portion of the problem and communicates intermediate results with other GPU devices as execution progresses. A local memory may be coupled to each GPU device for local program and data storage. Each local memory is conventionally accessed via an independent, local address space associated with the corresponding GPU. Each GPU may comprise multiple processing cores, and each core commonly implements a cache for efficient access to data that is relevant to an ongoing computation. Each local memory and each cache associated with a given GPU is conventionally configured to be exclusively accessed by the GPU. Each GPU may be configured to access a common system memory for communicating with a host central processing unit (CPU). The CPU may transmit data to the GPU via the system memory and receive data from the GPU via the system memory.

In a conventional cluster of multiple GPU devices, one GPU transmits data, such as intermediate results, to another GPU using a technique involving at least two copy operations and a temporary buffer in system memory. While technically feasible, this technique makes inefficient use of system resources such as bandwidth and memory. Furthermore, each transmitting GPU must execute programming instructions to bundle and transmit outbound data, which each receiving GPU must execute programming instructions to receive and unbundle the data. The overall process makes inefficient use of GPU resources, further reducing overall system efficiency. Additionally, each operation for transmitting a unit of data from one GPU to another GPU typically requires explicit programming instructions to be written by a developer, in an application development process that is inefficient with respect to developer time and attention.

As the foregoing illustrates, what is needed in the art is a technique that facilitates more efficient communication between GPU devices.

SUMMARY OF THE INVENTION

One embodiment of the present invention sets forth a method for accessing a unit of data stored within a unified memory associated with a hierarchical computation system, comprising determining a hierarchy level for the unit of data within the hierarchical computation system, generating a partial hierarchical address for the unit of data based on the hierarchical level and a node identifier associated with the unit of data, appending a first hierarchical level identifier and an offset to the partial hierarchical address to generate a hierarchical address for the unit of data; and requesting access to the unit of data based on the hierarchical address.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of embodiments of the present invention is that programs executing on a GPU cluster may efficiently access data within the unified address space. Each distinct memory circuit within each GPU associated with the GPU cluster is assigned a portion of the unified address space and is accessible from any GPU within the GPU cluster.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
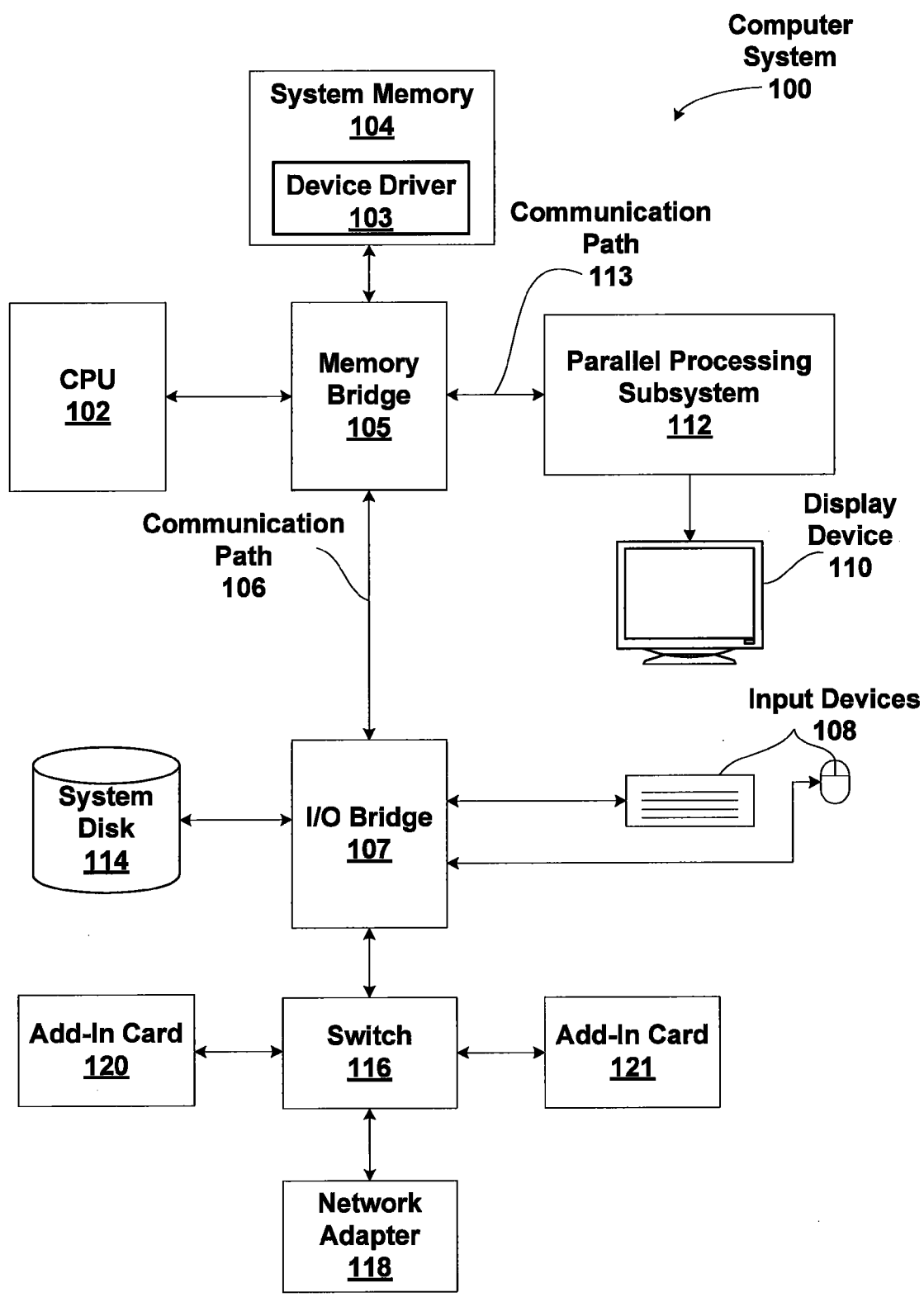
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and comprises at least one graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
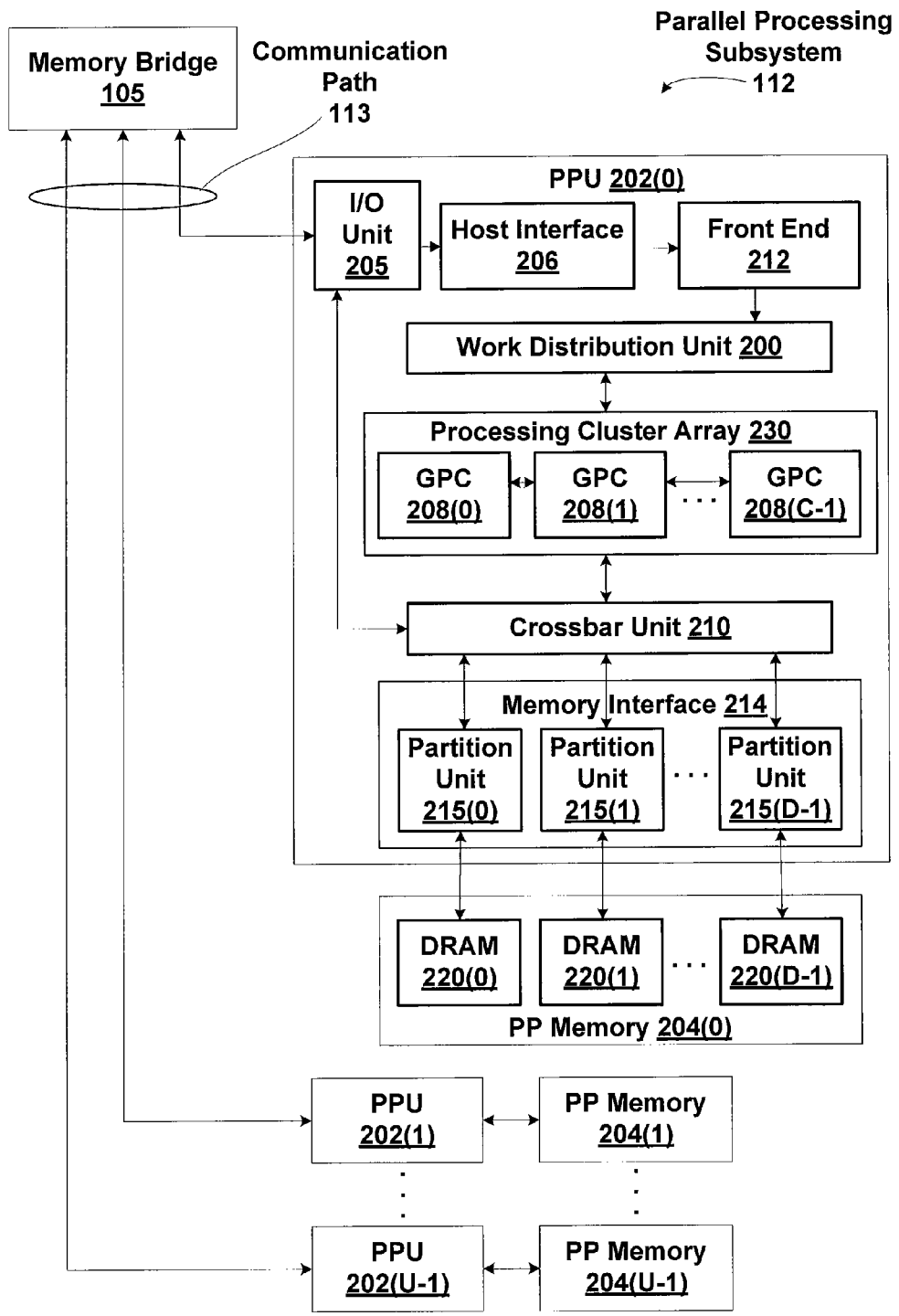
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processing units that may include rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1.

Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
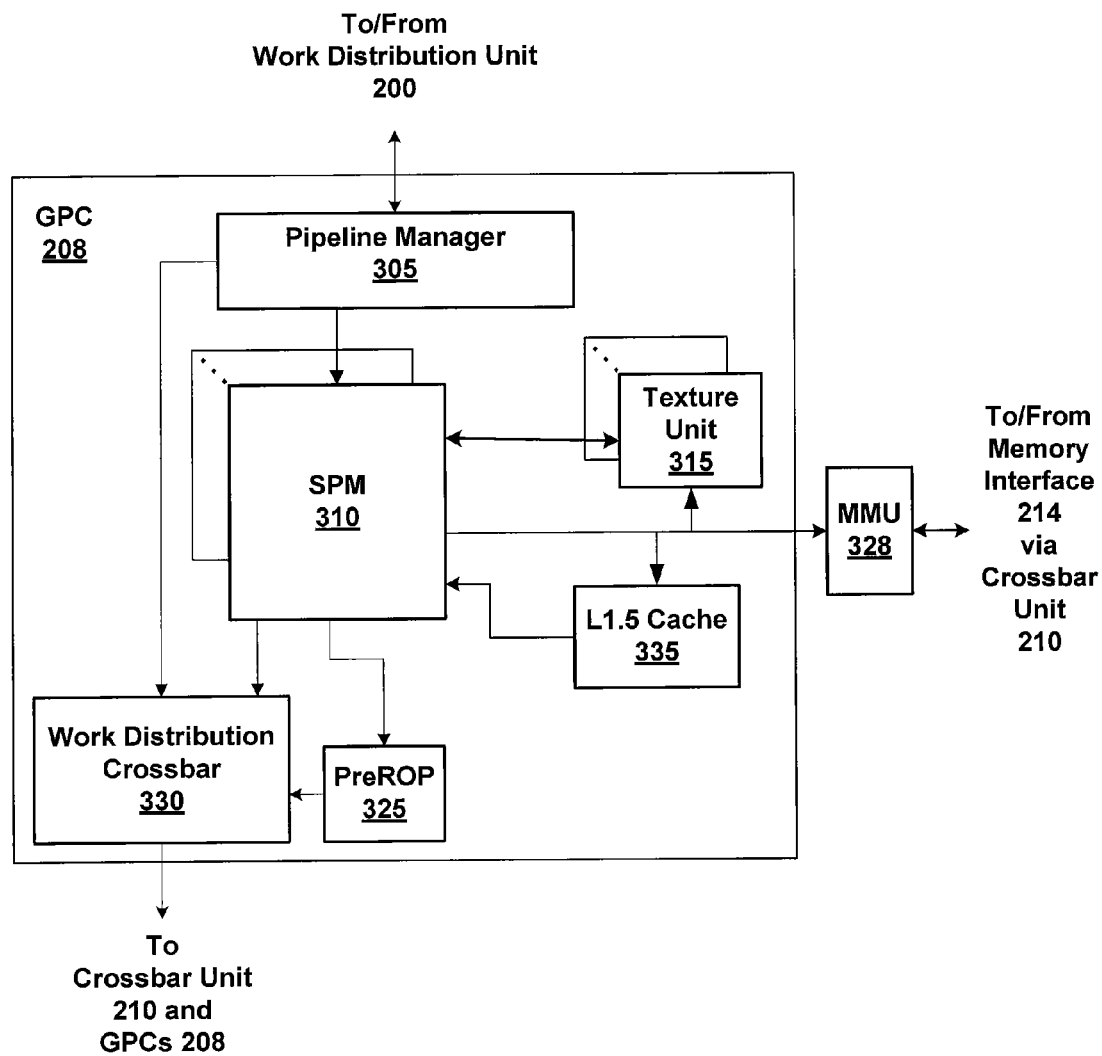
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
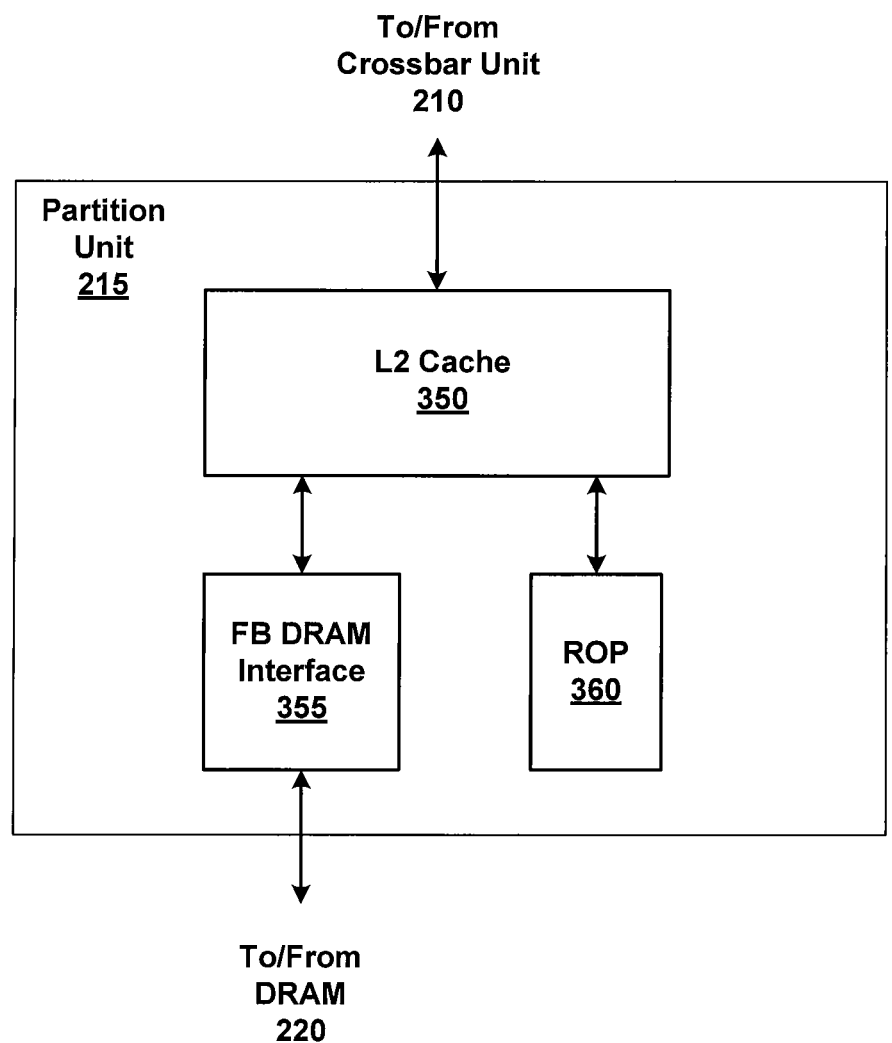
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
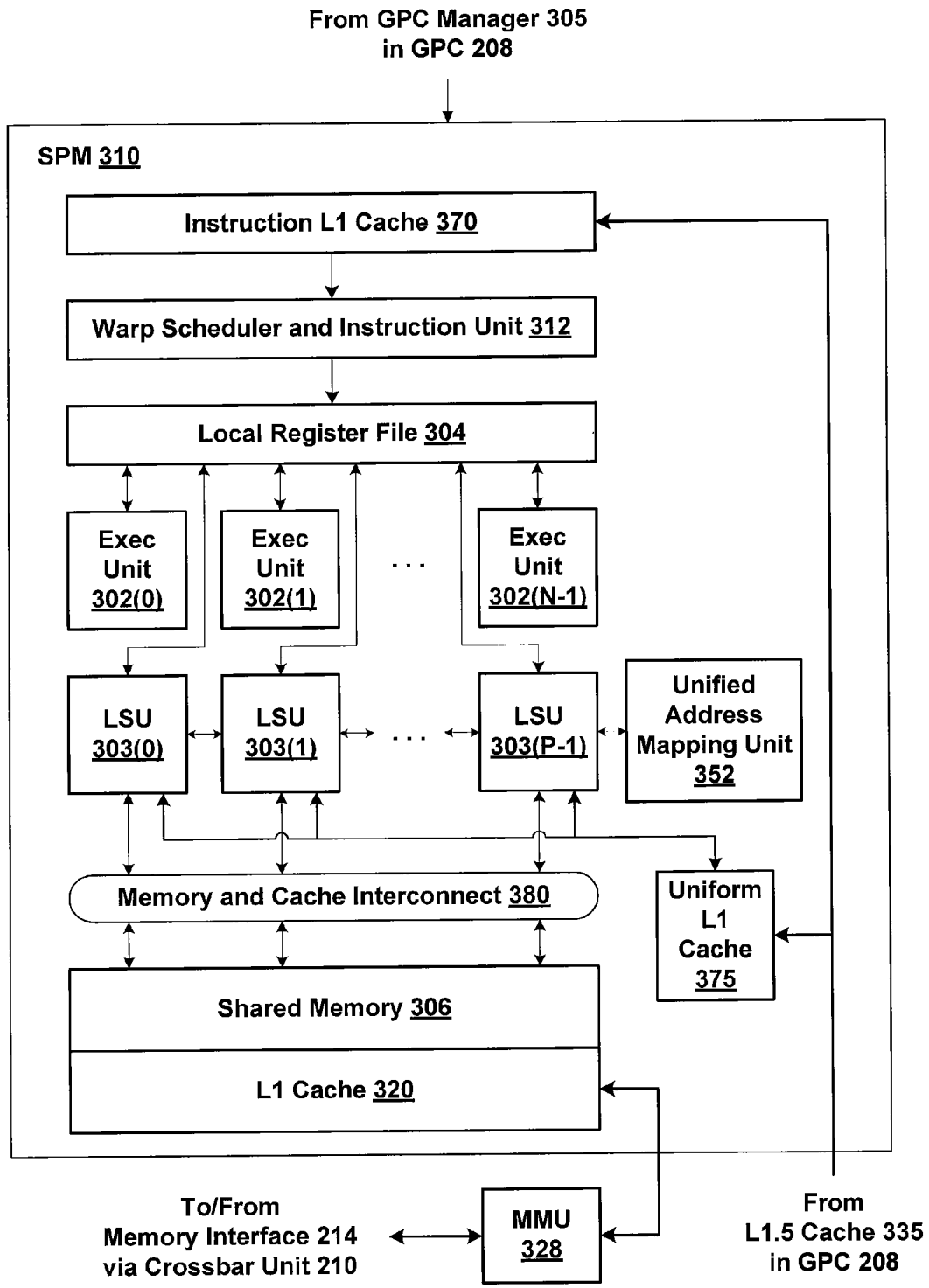
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Hierarchical Memory Addressing

A GPU cluster comprising two or more GPUs may be coupled directly together via a local interconnect, or via the memory bridge 105, as shown in FIG. 2. A GPU cluster comprising a plurality of GPUs may also be coupled together using a commodity networking interface, such as the well known Infiniband interface. In one embodiment, each GPU incorporates an Infiniband interface, for example as part of the I/O unit 205. In alternate embodiments, the memory bridge 105 incorporates an Infiniband interface, enabling GPUs coupled to one instance of the memory bridge 105 to communicate with GPUs coupled to another instance of the memory bridge 105.

In one embodiment, each GPU includes a set of seven "GPU-links" that permit glue-less composition of multi-GPU systems with two, four, or eight GPUs. In a two-node system, all seven links are connected between the two GPUs. In a four-node system, two links are connected to GPUs i+1 and i+3, and three links are connected to GPU i+2. In an eight GPU system, one link is connected between each pair of GPUs. The GPU links should be sized so that the aggregate GPU-link bandwidth is approximately one fourth the local bandwidth for a locally attached DRAM. The GPU-links are configured using any technically feasible technique to carry both memory traffic (read- and write-request and reply packets in granularities from one word to one cache line) and active messages.

Each GPU in a GPU cluster is assigned a portion of the unified address space that is shared and consistent across all GPUs within the GPU cluster. The unified address space may be extended to include one or more CPUs coupled to the GPU cluster. Topology information may be transmitted to each GPU, for example, as part of an address space assignment. In one embodiment, the one or more CPUs perform topology discovery and assign topology information to each GPU within the GPU cluster. Alternatively, each GPU may independently perform topology discovery.

The unified address space includes local memory and cache circuits within each GPU. Each memory and cache circuit within the unified address space is configured to be accessible by every GPU within the GPU cluster. In one embodiment, coherence and consistency are provided across the unified address space.

In one embodiment, the memory management subsystem within a given GPU is configured to perform block transfers between local memory circuits associated with the GPU and arbitrary regions of the unified address space. The block transfers may comprise fetching records with unit stride, arbitrary stride, gather/scatter operations, and copying operations. The arbitrary regions may comprise a hierarchy of distributed memory circuits within one or more other GPUs, local memory attached to the one or more other GPUs, dedicated memory subsystems, or any combination thereof. In one embodiment, each block associated with a block transfer comprises at least a portion of a cache line, and the memory management subsystem initiates a transfer when a corresponding element of a cache line is accessed locally by an associated GPU. For cacheable data, any read to a shared variable should return the most recent write to that variable. To ensure coherence, a directory may be maintained for every mutable line of memory that can potentially be shared in multiple caches. The address of the line uniquely identifies the location of the directory in global memory. The directory records a current state for the line, including, without limitation, an exclusive or shared status, an owner of the line, and a list of sharers. A hierarchical addressing scheme is implemented for accessing the unified address space. In one embodiment, the unified address space is accessed via an addressing scheme that specifies a level of the hierarchy along with a path from an address space root to an addressed location, as illustrated in greater detail below in FIG. 4.

Figure 4:
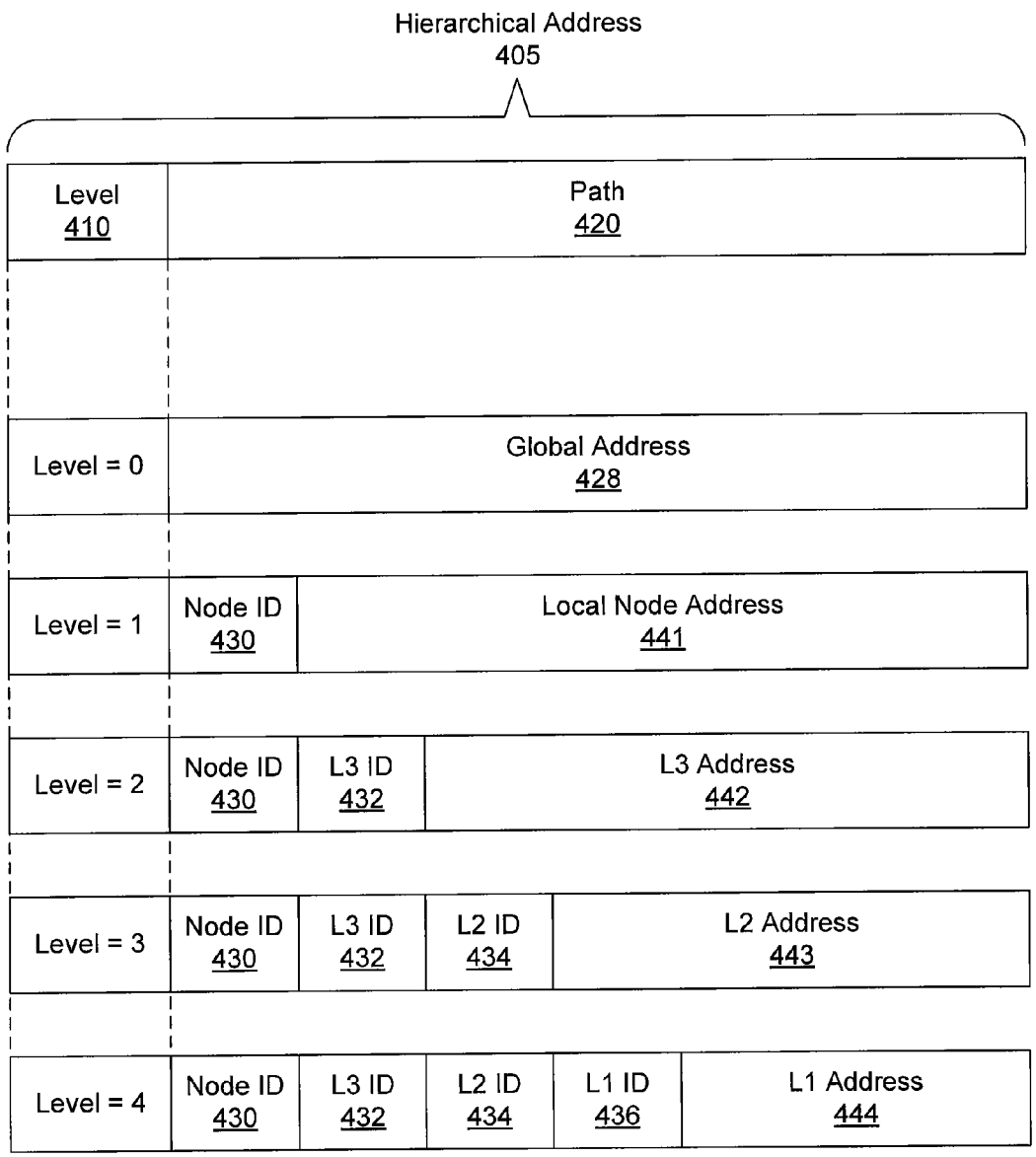
FIG. 4 illustrates an address encoding technique for uniquely locating data within a hierarchical GPU cluster, according to one embodiment of the present invention.

FIG. 4 illustrates an address encoding technique for uniquely locating data within a hierarchical GPU cluster, according to one embodiment of the present invention. As shown, a hierarchical address 405 comprises a level field 410 and a path field 420. The level field 410 indicates a level within a hierarchy of distributed memory circuits ("memory hierarchy") comprising the hierarchical GPU cluster where target data is located. The path field 420 is interpreted based on the level field 410. In one embodiment, a level field 410 value of "0" indicates the top of the memory hierarchy, which represents a global address space. The global address space maps to a first portion of the unified address space. A level field 410 value of "4" indicates the bottom of the memory hierarchy, which may correspond to a data location residing within a local memory circuit within a specific GPU.

If the level field 410 is equal to "0," then the path field 420 comprises a global address 428 associated with the top level of the memory hierarchy. If the level field is equal to "1," then the path field 420 is interpreted as having a node identification (ID) field 430, and a local node address field 438. The node ID field 430 identifies a specific GPU within the hierarchical GPU cluster. Each GPU identified by a node ID field 430 includes a unique local node address space, which may be addressed via the local node address field 441.

If the level field 410 is equal to "2," then the path field 420 is interpreted as having a node ID field 430, a level three (L3) address identifier (ID) field 432, and a level three (L3) address field 442. Each unique combination of values for the node ID field 430 and the L3 ID field 432 represents one unique address space, which may be addressed via the L3 address field 442.

If the level field 410 is equal to "3," then the path field 420 is interpreted as having a node ID field 430, an L3 ID field 432, a level two (L2) identifier (ID) field 434, and an L2 address field 434. Each unique combination of values for the node ID field 430, the L3 ID field 432, and L2 ID field 434 represents one unique address space, which may be addressed via the L2 address field 443.

If the level field 410 is equal to "4," then the path field 420 is interpreted as having a node ID field 430, an L3 ID field 432, an L2 ID field 434, a level one (L1) identifier (ID) field 436, and an L1 address field 444. Each unique combination of values for the node ID field 430, L3 ID field 432, L2 ID field 434, and L1 ID field 436 represents one unique address space, which may be addressed via the L1 address field 444.

In one embodiment, the level field 410 is left justified (located within a set of most significant bits) within the hierarchical address 405 and the node ID 430 is left justified next to the level field 410. Furthermore, the global address 428, local node address 441, L3 address 442, L2 address 443, or L1 address 444 are right justified (located within a set of least significant bits) within the hierarchical address 405.

The global address field 428 and each combination of values for the node ID field 430 through L1 ID field 436 represents a unique address space within the unified address space. Each unique address space corresponds to a particular memory circuit located in one GPU within the GPU cluster. In this way, the hierarchical address 405 may uniquely address data within any memory circuit located within any GPU within the GPU cluster. A special encoding for "here" may be used to replace any element of the path. For example, a field comprising all "1" values may indicate that the target location is local. Any technically feasible technique may be implemented to consistently enumerate the unique address spaces identified within the unified address space.

In the above example, five levels are identified within the hierarchical address 405, including a global, node, and three on-chip levels. In one embodiment, six levels of hierarchy are identified within the hierarchical address 405, including a global, node, and four on-chip levels. The node ID field comprises 16-bits and each local node address 441 comprises 38 bits. In such an embodiment, 57 virtual address bits are needed. A 64-bit virtual address may be implemented to include 57 bits, with level and node left aligned and the remainder of the address bits right aligned. Some address bits in the middle need not be interpreted.

A particular physical memory location can be used as an explicitly managed local memory or as a cache for higher levels of the hierarchy. In one embodiment, local memory, such as DRAM coupled to a given GPU, may be divided between global address space and local address space. The GPU provides configuration registers to enable storage at each level of the hierarchy to be divided between cache and explicitly-managed storage. One approach is to allow each "way" of each local memory to be configured as a cache or as an explicitly managed local memory. An alternative implementation divides each storage level by index address into a cache slice and an explicitly managed slice.

A local memory configured to perform as a cache can store lines with addresses from any level above that is in a cacheable address space. For example, an L2 cache can cache explicit L3 addresses, node addresses, and global addresses. However, the L2 cache may not be able to cache L3 addresses from a different node address.

A node ID having all "1" values at any position in the path field 420 specifies the current location (H or here). The tree representing the hierarchy of the GPU cluster need not be uniform.

Different caches at the same level may be different sizes and leaves of the tree may occur at different depths. For example, consider a combined GPU/CPU system where the CPU and the GPU share a "last-level" on-chip cache (level 2). In such a system, the CPU may have only a single level of cache below, meaning its leaf cache is at level 3, while the GPU may have two levels, meaning its leaves are at level 4. Programs executing on a GPU or CPU should be configured to have access to a tree structure that specifies size and depth to match program requirements to non-uniform trees.

To handle distribution of data up and down the hierarchy, the set of places that can be specified should be hierarchical so that at lower levels of the hierarchy one can specify not just the node, but the memory within the node (e.g., the shared memory on a particular SM). This is needed to provide for persistent hierarchical memory (i.e., data in lower levels of the memory hierarchy that persists over multiple CTAs). Persistent hierarchical memory may be critical to exploit higher levels of explicitly-managed on-chip memory since time constants associated with all but the bottom level will be longer than the lifetime of a single CTA. Supporting explicitly-managed memory at multiple levels may be important because it can reduce external memory bandwidth demand by a large factor, effectively multiplying the bandwidth of external memory. To provide for efficient execution, the programmer should be able to specify affinity between a thread or CTA and a portion of the hierarchical memory space. Any technically feasible technique may be implemented to explicitly manage memory and to specify thread (or CTA) affinity to a portion of the hierarchical memory space.

To facilitate virtualization, each local memory in the hierarchy should have one or more mapping registers that specify which node (or nodes) of a virtual hierarchy they hold. Tasks may also have a location register specifying which leaf node they are associated with. A task register may be used to replace the "here" fields of relative addresses with absolute node numbers at each level. If the fields match the local memory, then access is made locally, otherwise a search procedure is followed to find the current version of requested data.

In one embodiment, backing storage is provided for each local memory in global memory. The global memory represents a fall-back location for a local memory if it is not currently mapped into a local memory. The backing storage also facilitates running virtual hierarchies that are larger than the physical hierarchy.

Per line valid information may be used to allow for soft relocation of local memories. If a task is moved and its local memory relocated with it, the task can bring the contents of the local memory in on demand—either from the old location for the data or from a backing store residing in local memory.

Figure 5:
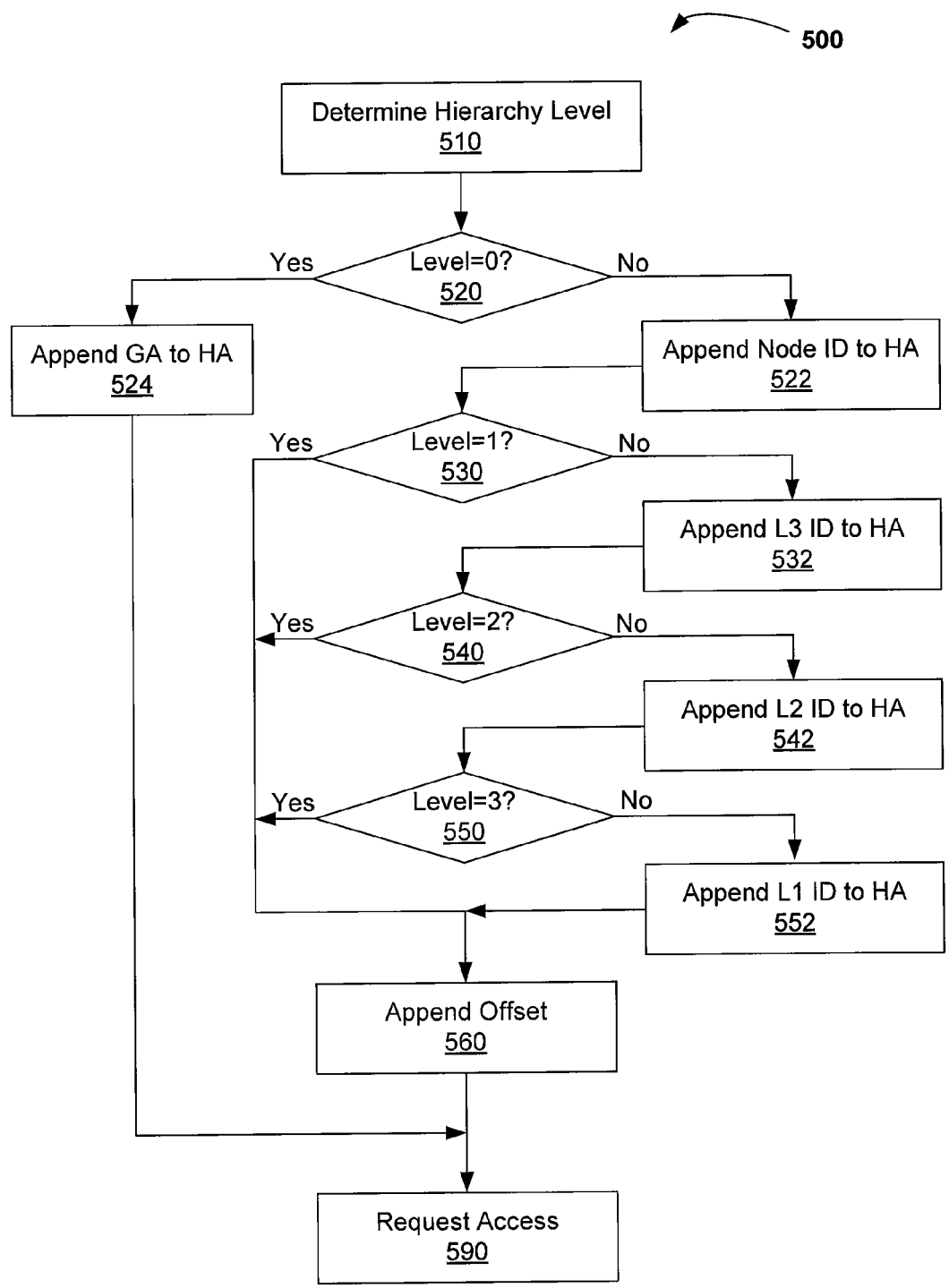
FIG. 5 is a flow diagram of method steps for generating an address encoding, according to one embodiment of the present invention.

FIG. 5 is a flow diagram of method steps 500 for generating an address encoding, according to one embodiment of the present invention. Although the method steps are described in conjunction with the systems of FIGS. 1-3C, persons skilled in the art will understand that any system configured to perform the method steps, in any order, is within the scope of the present invention. In one embodiment, the memory management subsystem performs the method steps 500.

The method begins in step 510, where a hierarchy level is determined for a particular unit of data being addressed via a hierarchical address, such as hierarchical address 405 of FIG. 4. The hierarchy level is written to the hierarchical address. If, in step 520, the hierarchy level is not zero, then the method proceeds to step 522, where a node ID for the unit of data is appended to the hierarchical address.

If, in step 530, the hierarchy level is not one, then the method proceeds to step 532, where a level three address ID for the unit of data is appended to the hierarchical address.

If, in step 540, the hierarchy level is not two, then the method proceeds to step 542, where a level two address ID for the unit of data is appended to the hierarchical address.

If, in step 550, the hierarchy level is not three, then the method proceeds to step 552, where a level one address ID for the unit of data is appended to the hierarchical address. In step 560 an offset is appended to the hierarchical address. The offset comprises a local physical address for a target memory circuit, and may be defined as a set of least-significant address bits for the hierarchical address. The method terminates in step 590, where access is requested for the unit of data. The access may comprise a read access, a write access, or any combination thereof, such as a read-modify-write access. The hierarchical address may be interpreted, without limitation, by crossbar unit 210 of FIG. 2, memory bridge 105, and I/O unit 205 to direct a memory access request comprising the hierarchical address to a target memory circuit where the unit of data resides.

Returning to step 520, if the hierarchy level is zero, then the method proceeds to step 524, where a global address is appended to the hierarchical address. The method then terminates in step 590.

Returning to step 530, if the hierarchy level is one, then the method proceeds to step 560.

Returning to step 540, if the hierarchy level is two, then the method proceeds to step 560.

Returning to step 550, if the hierarchy level is three, then the method proceeds to step 560.

In sum, a technique for addressing data within a hierarchical GPU cluster is disclosed. The technique involves constructing a hierarchical address based on the location of a storage circuit where a target unit of data resides. The hierarchical address comprises a level field indicating a hierarchical level for the unit of data and a node identifier that indicates which GPU within the GPU cluster currently stores the unit of data. The hierarchical address may further comprise one or more identifiers that indicate which storage circuit in a particular hierarchical level currently stores the unit of data. The hierarchical address is constructed and interpreted based on the level field.

One advantage of embodiments of the present invention is that programs executing on a GPU cluster may efficiently access data within the unified address space. Each distinct memory circuit within each GPU associated with the GPU cluster is assigned a portion of the unified address space and is accessible from any GPU within the GPU cluster.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for accessing a unit of data stored within a unified memory associated with a hierarchy of distributed memory circuits, the method comprising:
   determining a hierarchy level for the unit of data within the hierarchy of distributed memory circuits;
   generating a partial hierarchical address for the unit of data based on the hierarchical level and a node identifier associated with the unit of data;
   determining a quantity of hierarchical level identifiers based on the hierarchy level for the unit of data, wherein the quantity of hierarchical level identifiers increases for each level of the hierarchy starting from a top level to a bottom level of the hierarchy of distributed memory circuits;
   appending a number of hierarchical level identifiers equal to the quantity and an offset to the partial hierarchical address to generate a hierarchical address for the unit of data; and
   requesting access to the unit of data based on the hierarchical address.

2. The method of claim 1, wherein the node identifier comprises a unique value corresponding to a processing unit associated with the hierarchy of distributed memory circuits.

3. The method of claim 2, wherein the processing unit comprises a graphics processing unit.

4. The method of claim 2, wherein the processing unit comprises a central processing unit.

5. The method of claim 1, wherein the hierarchy level and node identifier are concatenated and stored as a set of most significant bits within the hierarchical address.

6. The method of claim 1, wherein the offset is stored as a set of least significant bits within the hierarchical address.

7. The method of claim 1, wherein requesting access comprises executing a block transfer operation using the hierarchical address to transfer a cache line of data from a first memory circuit within a first GPU to a second memory circuit within a second GPU.

8. A non-transitory computer-readable storage medium including instructions that, when executed by a processing unit, cause the processing unit to access a unit of data stored within a unified memory associated with a hierarchy of distributed memory circuits, the method comprising:
   determining a hierarchy level for the unit of data within the hierarchy of distributed memory circuits;
   generating a partial hierarchical address for the unit of data based on the hierarchical level and a node identifier associated with the unit of data;
   determining a quantity of hierarchical level identifiers based on the hierarchy level for the unit of data, wherein the quantity of hierarchical level identifiers increases for each level of the hierarchy starting from a top level to a bottom level of the hierarchy of distributed memory circuits;
   appending a number of hierarchical level identifiers equal to the quantity and an offset to the partial hierarchical address to generate a hierarchical address for the unit of data; and
   requesting access to the unit of data based on the hierarchical address.

9. The non-transitory computer-readable storage medium of claim 8, wherein the node identifier comprises a unique value corresponding to a processing unit associated with the hierarchy of distributed memory circuits.

10. The non-transitory computer-readable storage medium of claim 9, wherein the processing unit comprises a graphics processing unit.

11. The non-transitory computer-readable storage medium of claim 9, wherein the processing unit comprises a central processing unit.

12. The non-transitory computer-readable storage medium of claim 8, wherein the hierarchy level and node identifier are concatenated and stored as a set of most significant bits within the hierarchical address.

13. The non-transitory computer-readable storage medium of claim 8, wherein the offset is stored as a set of least significant bits within the hierarchical address.

14. The non-transitory computer-readable storage medium of claim 8, wherein requesting access comprises executing a block transfer operation using the hierarchical address to transfer a cache line of data from a first memory circuit within a first GPU to a second memory circuit within a second GPU.

15. A computing device comprising:
a memory controller configured to:
determine a hierarchy level for the unit of data within the hierarchy of distributed memory circuits;
generate a partial hierarchical address for the unit of data based on the hierarchical level and a node identifier associated with the unit of data;
determine a quantity of hierarchical level identifiers based on the hierarchy level for the unit of data, wherein the quantity of hierarchical level identifiers increases for each level of the hierarchy starting from a top level to a bottom level of the hierarchy of distributed memory circuits;
append a number of hierarchical level identifiers equal to the quantity and an offset to the partial hierarchical address to generate a hierarchical address for the unit of data; and
request access to the unit of data based on the hierarchical address.

16. The computing device of claim 11, wherein the node identifier comprises a unique value corresponding to a processing unit associated with the hierarchy of distributed memory circuits.

17. The computing device of claim 16, wherein the processing unit comprises a graphics processing unit.

18. The computing device of claim 16, wherein the processing unit comprises a central processing unit.

19. The computing device of claim 15, wherein the hierarchy level and node identifier are concatenated and stored as a set of most significant bits within the hierarchical address.

20. The computing device of claim 15, wherein the offset is stored as a set of least significant bits within the hierarchical address.

21. The computing device of claim 15, wherein to request access, the memory controller is configured to execute a block transfer operation using the hierarchical address to transfer a cache line of data from a first memory circuit within a first GPU to a second memory circuit within a second GPU.

22. The computing device of claim 15, wherein the hierarchical address includes a second hierarchical level identifier associated with the unit of data.

\* \* \* \* \*